United States Patent [19]
Longwell et al.

[11] Patent Number: 5,596,918
[45] Date of Patent: Jan. 28, 1997

[54] SPORTS CARD SLITTING DEVICE AND METHOD

[75] Inventors: Michael V. Longwell, San Marcos; Richard J. Lee, Walnut, both of Calif.

[73] Assignee: The Upper Deck Company, Carlsbad, Calif.

[21] Appl. No.: 230,600

[22] Filed: Apr. 21, 1994

(Under 37 CFR 1.47)

[51] Int. Cl.$^6$ .................................................. B26D 1/24
[52] U.S. Cl. .................. 83/332; 83/408; 83/481; 83/501; 83/425.2; 493/365
[58] Field of Search ........................ 83/482, 499, 500, 83/501, 502, 503, 504, 508.2, 481, 332, 304, 305, 698.41, 698.51, 859, 408, 425.3, 425.4, 425.2; 493/365, 367, 368

[56]          References Cited

U.S. PATENT DOCUMENTS

| | | | |
|---|---|---|---|
| 391,750 | 10/1988 | Koegel | 83/482 |
| 392,262 | 11/1888 | Edwards | 83/503 |
| 393,535 | 11/1888 | Browne | 83/499 |
| 398,575 | 2/1989 | Bess . | |
| 1,482,437 | 2/1924 | Koegel et al. . | |
| 1,754,969 | 4/1930 | Spoor . | |
| 2,117,220 | 5/1938 | Sieg . | |
| 2,187,211 | 1/1940 | McKinley et al. | 164/60 |
| 3,041,907 | 7/1962 | Gallagher, Jr. | 83/482 |
| 3,143,024 | 8/1964 | Markowski | 83/497 |
| 3,651,728 | 3/1972 | Young | 83/502 |
| 3,994,193 | 11/1976 | Bodycomb | 83/501 |
| 4,028,973 | 6/1977 | Bogdanski | 83/169 |
| 4,077,291 | 3/1978 | Obenshain | 83/499 |
| 4,092,886 | 6/1978 | Nowisch | 83/56 |
| 4,233,869 | 11/1980 | Meyer et al. | 83/500 |
| 4,380,945 | 4/1983 | Guild et al. | 83/482 |
| 4,405,121 | 9/1983 | Hill | 270/58 |
| 4,658,685 | 4/1987 | Bodewein | 83/302 |
| 4,905,554 | 3/1990 | Cavagna | 83/482 |
| 4,972,750 | 11/1990 | Paavola | 83/500 |
| 5,058,472 | 10/1991 | Kakko-Chiloff | 83/481 |
| 5,058,475 | 10/1991 | Tidland et al. | 83/481 |
| 5,083,489 | 1/1992 | Tidland et al. | 83/503 |
| 5,131,304 | 7/1992 | Paavola | 83/482 |
| 5,138,921 | 8/1992 | Winckler | 83/501 |
| 5,273,090 | 12/1993 | Klemma | 83/859 |
| 5,397,106 | 3/1995 | Hill | 83/408 |

FOREIGN PATENT DOCUMENTS

| | | | |
|---|---|---|---|
| 354136 | 2/1990 | European Pat. Off. | 83/859 |

*Primary Examiner*—Eugenia Jones
*Assistant Examiner*—Charles Goodman
*Attorney, Agent, or Firm*—Cahill, Sutton & Thomas P.L.C.

[57]                ABSTRACT

A slitting assembly for producing a plurality of "interrupted cut" slits in a large sheet of sport card photos includes a horizontal support track carrying a plurality of individual upper slitting assemblies each including a freely rotatable upper hub, an upper blade concentrically attached to the upper hub, a resilient band circumferentially disposed on the upper hub to frictionally engage the top surface of the sheet being slit, and an upper blade biasing element to resiliently urge an edge of the upper blade against an edge of the corresponding lower blade. The upper blades are precisely parallel to the lower blades to avoid interference with notches provided in the lower blades to interrupt the slits being made. The locations of the notches are selected to compensate for slippage resulting from the frictional engagement.

7 Claims, 3 Drawing Sheets

SPORTS CARD SLITTING DEVICE AND METHOD

BACKGROUND OF THE INVENTION

The invention relates to an improvement to a commercially available sport card slitting machine known as the "Rollem Slip Stream" machine, and more particularly to an improved first stage slitting assembly therefor.

Sport cards, such as baseball trading cards and the like, are very popular. Several major companies, including the present assignee, compete vigorously in this large market.

In the manufacture of sport cards, a large number of photographs of various individual athletes are printed on each of many large, single sheets of suitable paper (herein referred to as "photo sheets". The large photo sheets then are slit, first "horizontally" and then "vertically" to form a group or collection of individual sport cards which then are collated and packaged.

To this end, the sport card industry has used a card slitting machine called the "Rollem Slip Stream Machine". The "standard" Rollem Slip Stream machine includes a first stage slitting assembly that is manufactured by Rollem, and is shown in FIG. 1. Various aspects of the Rollem Slip Stream machine are disclosed in U.S. Pat. No. 4,405,121 by Hill, issued Sep. 20, 1983 entitled "Cutting and Collating Sheets of Paper Cards, etc.", and incorporated herein by reference.

FIG. 1 herein shows a top view diagram of the Rollem Slip Stream machine. A large (typically 28 inches by 40 inches) sheet of photographs is advanced by a sheet feeder 24 (FIG. 4) along a first section 11, as indicated by arrow 13. A first stage slitting assembly 15 includes a lower blade assembly 40 and an upper blade assembly 30, as shown in FIG. 3. The prior art Rollem first stage slitting assembly makes "interrupted cut" slits such as 21 in a photo sheet 20, as shown in FIG. 2. The "interrupted cut" slits 21 are necessary so that photo sheet 20 remains intact to allow it to be advanced as a unit first in direction 16 (FIG. 1) and then at a right angle in direction 17 to a second stage slitting assembly 18 into a second section 12, after the "horizontal" interrupted cut slits 21 are made. More specifically, in first stage slitting assembly 11, thirteen individual "interrupted cut" slits 21 are made, each of which extends to within approximately ½ inch of the opposed leading and trailing edges 20A and 20B (FIG. 2) of sheet 20, leaving edge margins 22A and 22B that maintain horizontally slit photo sheet 20 intact so further handling of the entire sheet is possible. The second stage slitting assembly 18 cuts a second set of "vertical" slits (not shown) that are perpendicular to the "horizontal" interrupted cut slits 21.

Referring to FIG. 3, the prior art Rollem Slip Stream first stage slitting assembly 15 includes thirteen upper hub/blade assemblies 30 mounted on a single-gear driven shaft 10. Each hub/blade assembly 30 includes a disk-shaped upper blade 30A secured by set screws (not shown) to a planar face of an upper hub 30B. Several set screws (not shown) secure the various hubs 30B to shaft 10, which is journaled in several stationary bearing assemblies (not shown).

Numeral 40 designates lower hub/blade assemblies of the standard Rollem first stage slitting assembly 15. Each lower hub/blade assembly 40 includes a blade 40A mounted on a hub 40B which in turn is mounted on a common shaft 41. Shaft 41 is gear driven and "synchronized" with the drive of the upper shaft 10 so that the cutting edge velocity of upper blade 30A is precisely the same as that of lower blade 40A. The lower blades 40A are of larger diameter than the upper blades 30A.

To produce the above-mentioned "interrupted cut" slits 21, lower blades 40A each have two spaced notches 40C-1 and 40C-2, as shown in 20 FIG. 4. The feeding of photo sheet 20 is synchronized to the times at which trailing edge 42A of notch 40C-1 and leading edge 42B of notch 40C-2 meet the upper blade 30A to produce the leading half inch margin 22A and the trailing half inch margin 22B (FIGS. 2 and 2A) that keep photo sheet 20 intact after the horizontal "interrupted cut" slits 21 are made.

The above-described prior art Rollem first stage slitting assembly 15 has several serious shortcomings, caused by the facts that (1) upper blades 30A all are very rigidly connected together by common shaft 10 and all of the lower blades 40A also are rigidly connected together by common shaft 41, (2) the lateral forces 52 (FIG. 3) with which the upper blades 30A abut the lower blades 40A is critical to the quality of the cuts, and (3) it is very difficult to adjust the individual positions of all thirteen of the upper hubs 30B supporting blades 30A on upper shaft 10 so that the lateral forces 52 of each upper blade 30A against the corresponding lower blade 40A are uniform, especially if either an upper blade 30A or a lower blade 40A happens to be slightly warped or non-uniformly worn.

Non-uniform lateral blade abutment forces 52 result in both excessive, irregular blade wear and ragged "interrupted cut" slits 21. In practice, operation of the Rollem Slip Stream machine often must be halted to allow (1) adjustment of the lateral blade abutment forces 52, and (2) various blade and maintenance/replacement operations. Such efforts and the resulting "down time" of the Rollem Slip Stream machine often interrupt production of sport cards for many hours. Efforts to "quick fix" a machine making slits 21 less ragged by adjusting a blade to increase the lateral blade abutment forces 52 often results in overheating of the blade edges and loss of temper thereof.

Consequently, for many years there has been an unmet need for a practical, economical solution to the above shortcomings of the Rollem Slip Stream sport card slitting machines even though such shortcomings were generally accepted as unavoidable.

SUMMARY OF THE INVENTION

Accordingly, it is an object of the invention to provide an improvement to the Rollem Slip Stream machine that reliably produces clean "interrupted cut" slits while avoiding excessive, irregular blade wear and excessive machine "down time" for slitting blade adjustment, maintenance, or replacement.

It is another object of the invention to reduce blade wear in an interrupted cut slitting machine.

It is another object of the invention to reduce the frequency of adjustments required for blades in a Rollem Slip Stream sport card slitting machine.

It is another object of the invention to provide uniform blade abutment pressure in a Rollem Slip Stream sport card slitting machine.

It is another object of the invention to reduce the amount of time required to change slitting blades in a Rollem Slip Stream machine.

Briefly described, and in accordance with one embodiment thereof, the invention provides an improvement in a slitting machine that includes a first slitting stage which makes a plurality of "interrupted cut" slits in a large sheet, wherein the first slitting stage includes a lower slitting assembly and an upper slitting assembly. The lower slitting assembly includes a gear-driven lower shaft supported by bearings, a plurality of cylindrical lower hubs rigidly mounted concentrically on the lower shaft, and a plurality of slotted lower blades rigidly attached in concentric relationship to faces of the lower hubs, respectively. A sheet feeder mechanism is synchronized to the locations of the notches in the lower blades in order to effectuate making of interrupted cut slits. The first slitting stage includes a stationary horizontal support track and a plurality of separate upper slitting assemblies each rigidly attached to the support track above a corresponding lower blade. Each upper slitting assembly includes a non-powered, freely rotatable upper hub, an upper blade attached in concentric relationship to each upper hub, respectively, a resilient drive band circumferentially disposed on the upper hub to frictionally engage the sheet being slit and thereby drive the upper hub, and an upper blade biasing element to resiliently urge an edge of the upper blade laterally against an edge of the corresponding lower blade.

The plane of a cutting edge of each upper blade is precisely parallel to a plane of a cutting edge of each corresponding lower blade, to thereby avoid interference between the upper blades and the notches of the lower blades. The notches of each lower blade are spaced on the periphery thereof by an amount that equals the length of each intended slit plus an amount corresponding to slippage of the resilient drive band against the sheet being slit.

DETAILED DESCRIPTION OF THE PREFERRED EMBODIMENTS

Figure 3:
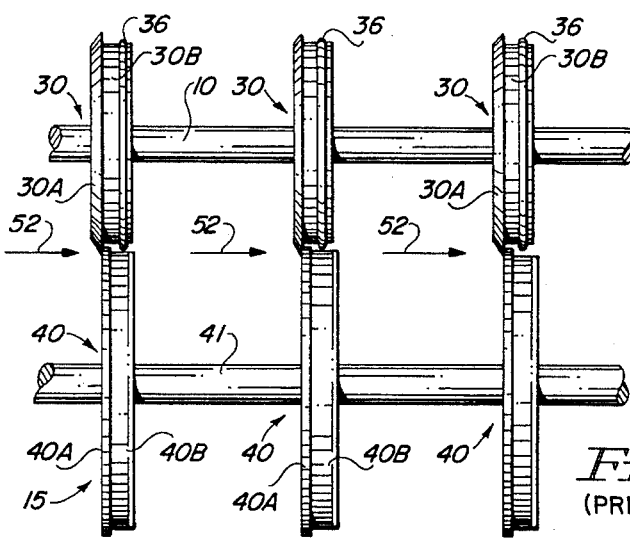
FIG. 3 is an elevational view diagram of the exit side of the prior art first stage slitting assembly.
Figure 5:
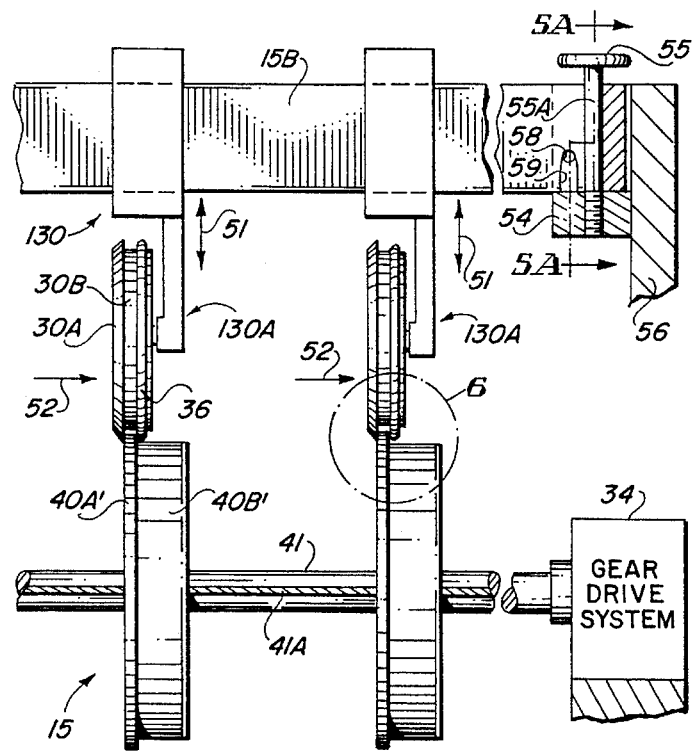
FIG. 5 is an elevational exit side view of the slitting assembly of the present invention.
Figures 6, 7:
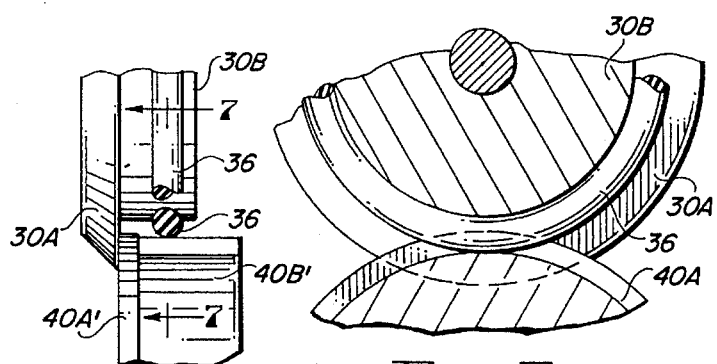
FIG. 6 is an enlarged view-of detail 6 of FIG. 6.
FIG. 7 is a section view taken along section line 7—7 of FIG. 6.

In accordance with the present invention, the prior art upper slitting assembly 30 shown in FIG. 3, with the upper blades 30A all mounted on a common gear-driven shaft 10, is removed and replaced by the upper slitting assembly 130 shown in FIG. 5. (Note that where appropriate in FIG. 5, the same reference numerals are used as in FIG. 3 to designate similar or corresponding parts.)

Figure 9:
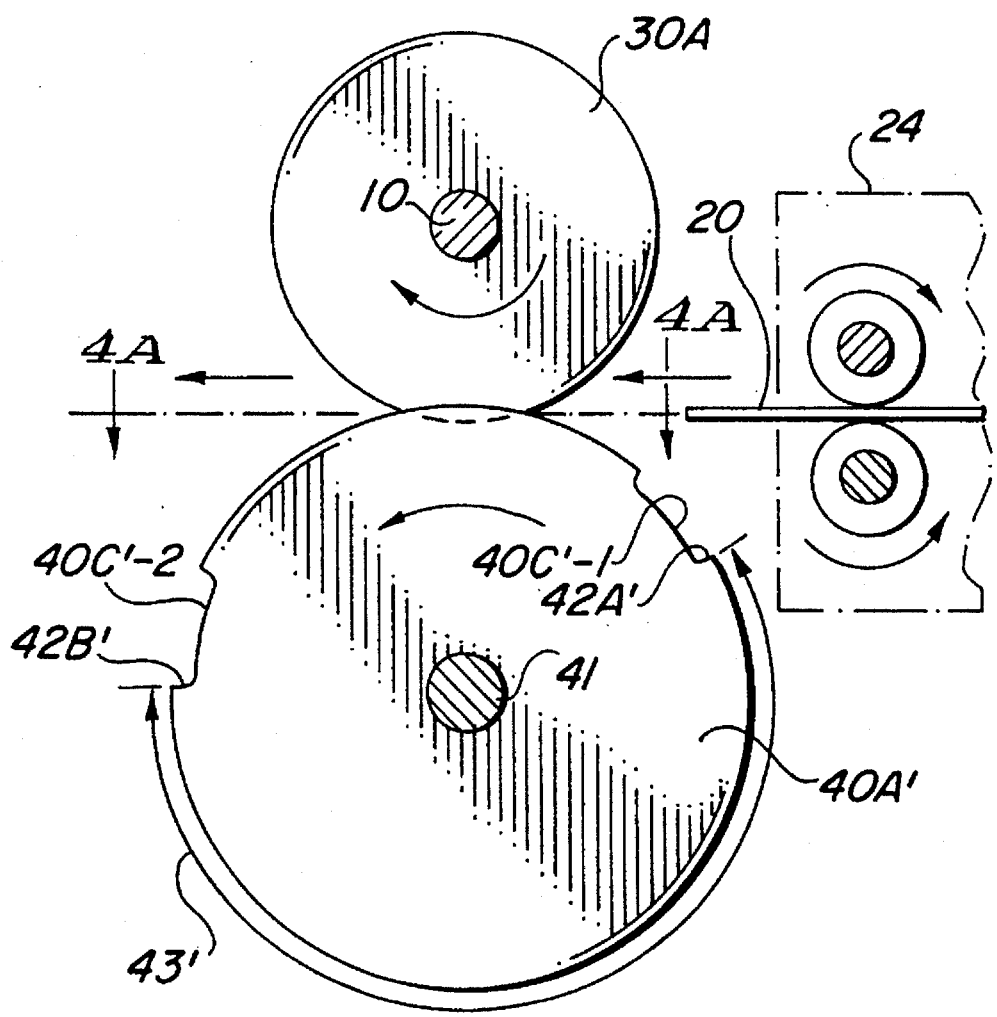
FIG. 9 is an end view diagram illustrating the improvement of the lower slitting blade according to the present invention.

Upper slitting assembly 130 includes a "drop-in" mounting track 15B that supports thirteen individual slitting assemblies 130A independently mounted thereon above corresponding lower slitting blades 40A'. The lower slitting assembly 40' includes gear driven shaft 41, thirteen lower hubs 40B', and thirteen lower blades 40A' which are essentially identical to those in a standard Rollem Slip Stream machine, except that the circumferential distance 43' between the trailing edge 42A' of notche 40C-1' and the leading edge 42B' of notch 40C'-2 (FIG. 9) is modified to account for slippage between the lower hubs 40B' and the lower surface of the sheet 20 being slit and nevertheless produce precisely the correct length and location of each slit 21. Keyway 41A (FIG. 5) in shaft 41 ensures that notches 40C'-1 and 40C'-2 (FIG. 9) of each lower blade 40A' are precisely aligned with each other.

Each of the upper slitting assemblies 130A can be SERIES "C" KNIFEHOLDERS, CLASS I for shear and score slitting, commercially available from Tidland Corporation of Camas, Wash.

Figure 8:
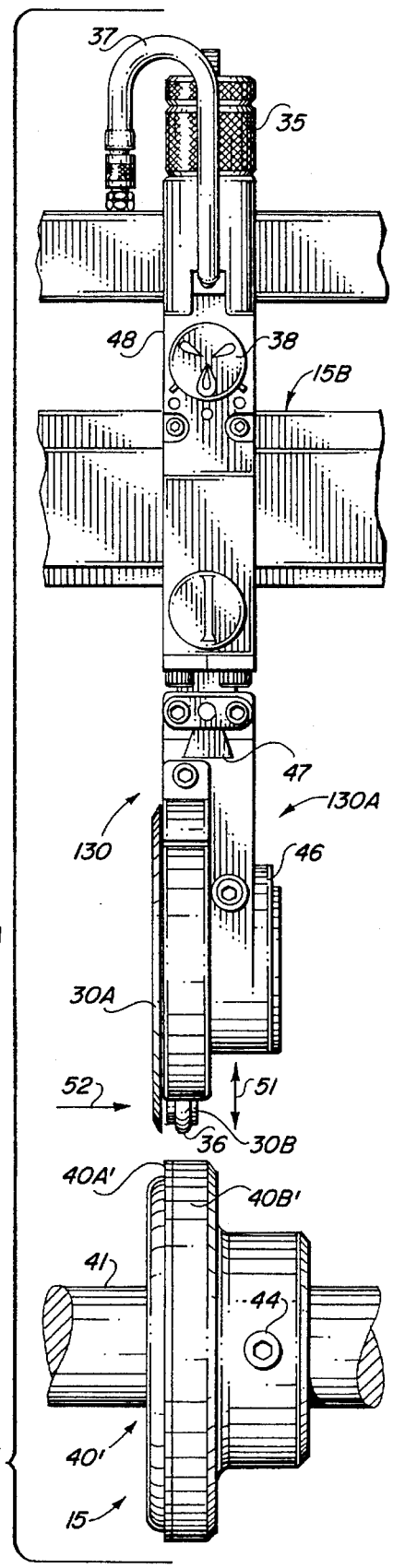
FIG. 8 is a partial elevation view showing details of one upper slitting blade assembly and a corresponding portion of the lower slitting blade assembly as in FIG. 5.

The Tidland upper slitting assemblies 130A are pneumatically actuated, the pneumatic pressure being delivered via pneumatic tubes 37 (FIG. 8) connected from an external source to the upper part 48 of each upper slitting assembly 130. Each Tidland upper slitting assembly 130A includes a bearing-mounted hub 30B having an O-ring 36 disposed in a circumferential groove (not shown). An upper slitting blade 30A is attached by means of set screws (not shown) to the left face of each hub 30B.

A hub support mechanism 46 (FIG. 8) rotatably supports hub 30B, and contains a pneumatically actuated lateral shifting mechanism that allows hub 30B and blade 30A thereon to be shifted and biased or urged by blade abutment force 52 (roughly 1 to 10 pounds) to the right against the edge of the corresponding lower blade 40A' from an initial position (at which upper blade 30A is slightly laterally positioned to the left of lower blade 40A'). Hub support mechanism 46 is attached by means of a dovetail element 47 to upper section 48 of upper slitting assembly 103 that is attached to support track 15B, thereby allowing each hub support 46 to be easily removed for the purpose of blade maintenance, replacement, or inspection.

The height of upper slitting blade 30A relative to lower slitting blade 40A' can be shifted as indicated by arrows 51 between "up" and "down" positions by rotating mode switch knob 38. The precise height of blade 30A relative to blade 40A' in the "down" position can be precisely adjusted by rotating knob 35, causing O-ring 36 to ride on and frictionally engage the upper surface of photo sheet 20 as it is being advanced between the upper slitting assembly 130 and the lower slitting assembly 40', thereby imparting rotation to upper hub 30B and hence to upper blade 30A. The force of O-ring 36 on the upper surface of sheet 20 therefore is adjustable by knob 35.

Figure 1:
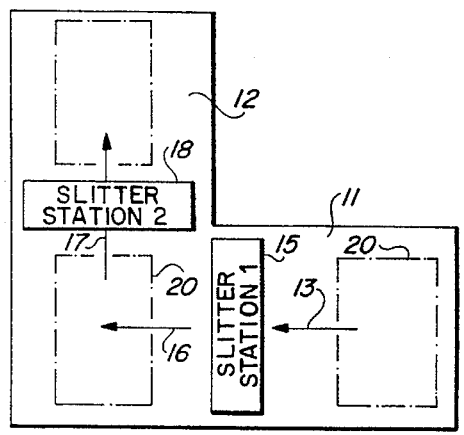
FIG. 1 is a top view diagram illustrating the general directions of movement of a sheet through a prior art "interrupted cut" slitting machine.
Figure 2:
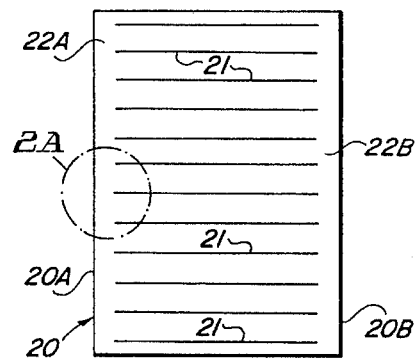
FIG. 2 is a diagram illustrating "interrupted cut" slits in a sheet to be slit into individual sports card photographs.
Figure 2A:
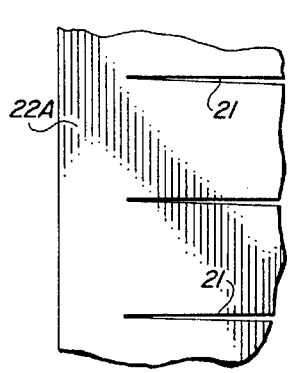
FIG. 2A is an enlarged view of detail to 2A of FIG. 2.
Figure 4:
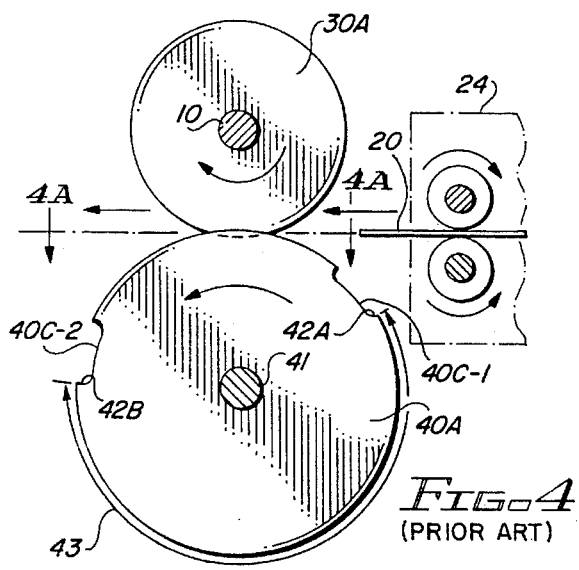
FIG. 4 is an end view diagram illustrating notches in a lower slitting blade synchronized with a sheet advancing mechanism to produce interrupted cut slits in a prior art interrupted cut slitting machine.
Figure 4A:
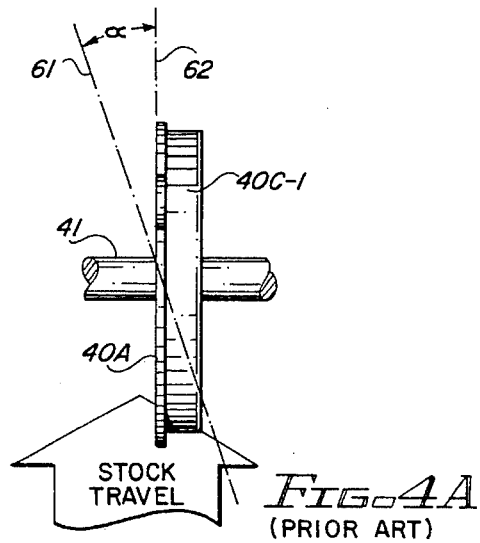
FIG. 4A is a diagram useful in describing a non-zero cant angle used in prior "continuous cut" slitting machines in order to obtain "clean" slits.

As previously mentioned, the known prior applications of the above-mentioned Tidland slitting assembly have been directed to slitting of continuous webs, not to making "interrupted cut" slits such as 21 in FIG. 2. Small, non-zero cant angles such as α shown in between the plane 61 or the upper blade 30A and the plane 62 of the lower blade 40A as FIG. 4A generally have been used in such prior applications to improve the quality of the slits being made.

To Tidland engineers who were consulted, the apparent need for non-zero cant angles initially was a substantial deterrent to application of the Tidland technology to solve the above described problems of the Rollem Slip Stream machines. This may have been because a non-zero cant angle would result in interference of the sharp edges of the upper slitting blades 30A with the notches 40C-1 and 40C-2 (FIG. 4) of the lower blades 40A. Furthermore, in the Tidland technology the unpowered upper hubs rotate freely, in contrast with the gear-driven upper hubs synchronized with the lower hubs in the standard Rollem Slip Stream machines. Therefore, there was some slippage of the sheets relative to the upper and lower hubs and blades, This also was seen by Tidland engineers as a deterrent to use of the Tidland technology in the Rollem Slip Stream machine.

However, in accordance with the present invention, it was discovered that if the cant angle $\alpha$ (FIG. 4A) is made precisely equal to zero, so that the planes 61 and 62 of the cutting edges of upper slitting blade 30A and lower slitting blade 40A, respectively, are essentially parallel, and if a suitable abutment force 52 of each upper blade 30A against the corresponding lower blade 40A' is maintained, then clean interrupted cut slits 21 can be reliably made, provided that slippage of the lower hubs 40B' against the bottom surface of the advancing photo sheet 20 is accounted for in the circumferential distance 43' between the trailing edge 42A' of notche 40C'-1 and the leading edge 42B'60 of notch 40C'-2.

In accordance with the present invention, the average slippage between lower hubs 40B' and photo sheet 20 is determined empirically, and the circumferential distance 43' between the "trailing" edge 42A' of notch 40C'-1 of lower blade 40A' and the "leading" edge 42B' of notch 40C'-2 of lower blade 40A' is selected to account for such slippage, which may differ for various types and surface finishes of the sheet 20 being advanced through the first stage slitter 15.

Figure 5A:
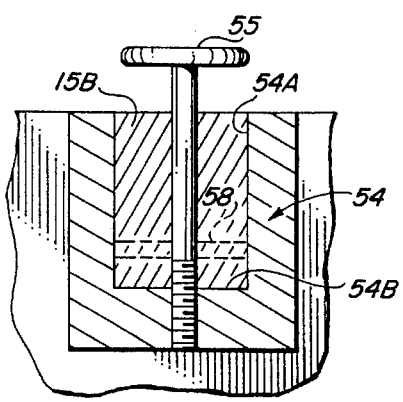
FIG. 5A is a diagram taken along section line 5A—5A of FIG. 5, illustrating drop-in mounting track brackets of the system shown in FIG. 5.

An entire upper slitter assembly 130 can be easily removed from two U-shaped "drop-in" receiving brackets 54 in FIG. 5A. U-shaped receiving brackets 54, securely mounted on opposed side walls 56 of the Rollem Slip Stream machine, each have a recess 54A (FIG. 5A) into which the opposed ends of supporting track 15B are lowered. Each end portion of support track 15B has a transverse "inverted-saddle" shaped recess 59 (FIG. 5) in its bottom surface for receiving a transverse alignment pin 58 (FIGS 5 and 5A) attached to the sides of bracket 54 to ensure immediate, accurate alignment of support track 15B with brackets 54. An attachment bolt 55A (FIG. 5) having a rotary handle 55 is passed through a vertical clearance hole in each end of support track 15B and tightened into a corresponding threaded hole in the bottom section 54B (FIG. 5A) of U-shaped receiving bracket 54 to secure both ends of supporting track 15B to main frame 56. The entire upper slitting assembly 130 therefore can be easily removed, placed in a suitable jig, and the desired locations of the individual upper slitting assemblies 130A on track 15B can be achieved using suitable templates that match the spacing between columns of individual sports cards to be cut from a large photo sheet 20. This replacement of an entire upper slitting assembly in one operation helps reduce production down time for blade adjustment or replacement.

Several months of experimentation were required to discover an acceptable solution to the problem of interference between the edges of the upper slitting blades 30A and the notches 40C-1 and 40C-2 in the lower blades 40A and the problem of slippage between the lower hubs 40B and photo sheets 20 of various thicknesses, paper types, and surface finishes. However, after the present prototype system was constructed and optimized, the "down time" of the Rollem Slip Stream machines to adjust blade abutment pressure was greatly reduced. Slitting blade life increased from a few months to many months. Furthermore, a single blade 30A could be replaced in ten to fifteen minutes, instead of several hours. Thus, it is expected that very substantial improvements in overall productivity of Rollem Slip Stream machines will be achieved by the present invention. With the slitting apparatus optimized as described above, the quality of the cuts or slits 21 is, over a long period of time, is substantially improved.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention. For example, any kind of cards or "sub sheets" such as tickets, can be cut out of the main sheet 20.

What is claimed is:

1. In a sport card slitting machine including a first slitting stage for producing a plurality of interrupted cut slits of a predetermined length in a sheet, the first slitting stage having a lower slitting assembly including i. a gear-driven lower shaft, ii. a plurality of lower hubs rigidly mounted on the lower shaft, iii. a plurality of lower blades rigidly attached to the lower hubs, respectively, each lower blade having first and second notches in a circumferential cutting edge of the lower blade, the first notch having a trailing edge, the second notch having a leading edge, there being a circumferential distance between the trailing edge of the first notch and the leading edge of the second notch, iv. a sheet feeder synchronized to a location of the trailing edge of the first notch of each of the lower blades to effectuate interruptions in the slits made by the first slitting stage, the improvement comprising in combination:

(a) a track in the first slitting stage;

(b) a plurality of separate upper slitting assemblies each attached rigidly to the track above a corresponding lower blade, the upper slitting assemblies each including i. a freely rotatable upper hub, ii. an upper blade attached to each upper hub, iii. a resilient band circumferentially disposed on the upper hub to drive the upper hub by frictional engagement with the lower hub or the sheet as it is being slit, and iv. an upper blade biasing mechanism to resiliently urge an edge of the upper blade against the circumferential cutting edge of the corresponding lower blade, a plane of a cutting edge of each upper blade being parallel to a plane of a cutting edge of each corresponding lower blade to achieve a cant angle that avoids interference between each upper blade and the first and second notches of each corresponding lower blade, respectively, and the circumferential distance between the trailing edge of the first notch and the leading edge of the second notch being equal to the predetermined length of each slit plus an amount corresponding to a predetermined average slippage of the resilient band on a surface of the sheet as the lower blade rotates from a point at which the trailing edge of the first notch meets the edge of the upper blade to another point at which the leading edge of the second notch meets the edge of the upper blade.

2. In a sport card slitting machine, the improvement as recited in claim 1 wherein the sheet is composed of paper, an upper surface of which frictionally engages the resilient band.

3. In a sport card slitting machine, the improvement as recited in claim 2 wherein the sheet has a finish on its upper and lower surfaces which causes or contributes to the slippage.

4. In a sport card slitting machine, the improvement as recited in claim 1 wherein the upper blades and lower blades are disk-shaped and are relatively thin compared to the upper and lower hubs, the circumferential distance between the trailing edge of the first notch and the leading edge of the second notch being approximately 0.7 per cent greater than the predetermined length of the slits to compensate for the slippage of the sheet.

5. In a sport card slitting machine, the improvement as recited in claim 4 wherein each upper slitting assembly includes an adjusting mechanism urging the resilient band against the upper surface of the sheet with a force in the range of 1 to 10 pounds.

6. In a sport card slitting machine, the improvement as recited in claim 1 including first and second brackets rigidly attached to a stationary frame of the slitting machine, the first and second brackets receiving and supporting opposed ends of the track, the improvement further including first and second securing elements removably securing the opposed ends of the track into the first and second brackets, respectively, to permit the track and upper slitting assemblies to be removed or installed as a unit to permit replacement or servicing of the upper blades at a location away from the slitting machine.

7. In a sport card slitting machine, the improvement as recited in claim 6 wherein each of the first and second brackets includes a first alignment element, and each of the opposed ends of the track includes a second alignment element that mates with a corresponding one of the first alignment elements, respectively.

* * * * *